United States Patent [19]

Denzinger et al.

[11] 4,013,825

[45] Mar. 22, 1977

[54] MANUFACTURE OF INSOLUBLE AND ONLY SLIGHTLY WATER-SWELLABLE POLYMERS OF N-VINYL LACTAMS OF IMPROVED ADSORPTIVITY

[75] Inventors: Walter Denzinger, Speyer; Ernst Hofmann; Karl Herrle, both of Ludwigshafen, all of Germany

[73] Assignee: BASF Aktiengesellschaft, Ludwigshafen (Rhine), Germany

[22] Filed: July 3, 1975

[21] Appl. No.: 592,811

[30] Foreign Application Priority Data

Aug. 5, 1974 Germany .......................... 2437640

[52] U.S. Cl. .................. 526/208; 210/54; 526/220; 526/264
[51] Int. Cl.² ................. C08F 26/06; C08F 26/10

[58] Field of Search ............... 526/208, 220, 264; 260/77.5 C

[56] References Cited

UNITED STATES PATENTS

| 2,544,638 | 3/1951 | Caldwell | 260/77.5 C |
| 2,982,762 | 5/1961 | Voeks et al. | 526/264 |

*Primary Examiner*—Harry Wong, Jr.
*Attorney, Agent, or Firm*—Johnston, Keil, Thompson & Shurtleff

[57] ABSTRACT

Manufacture of insoluble polyvinyl lactams in the absence of oxygen and in the presence of α- or β-ketocarboxylic acids or esters thereof.

3 Claims, No Drawings

MANUFACTURE OF INSOLUBLE AND ONLY SLIGHTLY WATER-SWELLABLE POLYMERS OF N-VINYL LACTAMS OF IMPROVED ADSORPTIVITY

The literature describes a variety of processes for the manufacture of insoluble and only slightly water-swellable polymers of vinyl lactams. According to U.S. Pat. No. 2,938,017, the polymerization is carried out in the absence of water and in the presence of alkalis at temperatures greater than 150° C. The process described in German 1,268,391 consists in partially polymerizing, say, vinyl pyrrolidone in the presence of alkalis and small amounts of water at from to 200° C and then completing polymerization at from 80° to 100° C. According to German Pat. 2,059,484, the problem is solved by carrying out the polymerization in the presence of small amounts of a cyclic acid amide such as divinyl ethylene urea, polymerization taking place on metal surfaces which are capable of being attacked by oxygen. However, this process is not completely satisfactory. It is difficult to control as the polymerization reaction requires starting periods of a duration difficult to foresee. On account of the long reaction time, the high temperature and the high pH values, the products show a brown discoloration. The last-named process provides satisfactory results as regards the properties of the polyvinyl lactams, but the products are too coarse and it is therefore necessary, in a number of applications, to subject them to grinding.

It is an object of the present invention to provide insoluble and only slightly water-swellable polylactams or copolymers thereof in the form of very fine granules showing good adsorptivity and good filtering properties.

Our process for the manufacture of insoluble and only slightly swellable polymers or copolymers of N-vinyl lactams in dilute aqueous solution in the presence of a cyclic acid amide containing at least two ethylenically unsaturated groups, of which at least one is attached to an amide nitrogen atom, is characterized in that the polymerization is caused to take place in the absence of oxygen and in the presence of from 0.05 to 2% by weight, based on vinyl lactam, of at least one α- or β-ketocarboxylic acid or a methyl or ethyl ester thereof.

The concentration of the vinyl lactam in the reaction mixture is advantageously such as to maintain the mixture in a readily stirrable state throughout the reaction. When using conventional stirred vessels, this concentration is from about 5 to 20% and preferably from 5 to 10%, by weight of the water present. The concentration may be raised to 40% by weight, if particularly powerful stirrers are available.

It may be advantageous to start the process at a relatively high concentration and to add water in the course of polymerization in order to maintain the mixture in a readily stirrable state or to make it stirrable toward the end of the reaction.

Vinyl lactams suitable for use in the present invention are, primarily, N-vinyl pyrrolidone and N-vinyl caprolactam; other lactams such as N-vinyl piperidone and the corresponding homologs may also be polymerized by our process.

Moreover, the different N-vinyl lactams may be copolymerized with each other if desired. For example, use if made of N-vinyl pyrrolidone and from 5 to 100% by weight, based on the N-vinyl pyrrolidone, of one of the other said N-vinyl lactams.

Apart from water and the said monomers, the mixture contains from about 0.5 to 10%, by weight of said monomers, of a cyclic acid amide containing at least two ethylenically unsaturated groups, of which at least one is attached to an amide nitrogen atom. We prefer to use divinyl ethylene urea. This compound initiates the particular polymerization reaction leading to the formation of an insoluble and only slightly swellable polymer. The free-radical initiators conventionally used for such polymerizations need not be employed. In any case, they would produce only highly swellable polymer portions.

Polymerization is advantageously carried out at pHs above 6 to avoid saponification of the N-vinyl lactam. Advantageously, polymerization is carried out in a pH range of from 7 to 9, since higher pHs might lead to yellowing of the polymer. The desired pH is obtained by adding small amounts of alkalis such as sodium hydroxide, ammonia or the conventional buffer salts such as sodium carbonate, sodium bicarbonate, sodium phosphate and sodium acetate. Urea and ammonium carbonate are also suitable.

Polymerization is effected in the absence of oxygen. This may be effected by applying a vacuum to the point where simmering occurs at a given temperature or by means of an inert gas. Usually, polymerization begins spontaneously when the oxygen is removed.

It is well known that oxygen may suppress free radical polymerization. However, it is surprising that this is the case in the present process. As indicated above, no free-radical initiators are used in the present process; in fact, they are deliberately excluded, since they merely lead to the formation of relatively soluble and highly swellable polymers.

The temperatures at which polymerization is carried out may vary within wide limits and is advantageously from 50° to 100° C. Although it is possible to operate at higher or lower temperatures, no particular advantages are gained thereby.

The essential feature of the invention consists in effecting polymerization in the presence of from about 0.05 to 2% and preferably from 0.1 to 0.5%, by weight of the aqueous polymerization mixture, of at least one α- or β-ketocarboxylic acid or a methyl or ethyl ester thereof. The most suitable substances for this purpose are ascorbic acid, ethyl acetoacetate and pyruvic acid. Addition of these substances is advantageously effected after the atmospheric oxygen has been removed from the mixture.

The polymerization rate is generally little influenced by the additions, but there are cases in which either acceleration or deceleration of polymerization is caused thereby. The decisive effect achieved by the addition of said substances consists in the increased adsorptivity of the polymers particularly for tannins occurring, for example, in vegetable beverages. Consequently, the polymers produced in the process of the invention are extremely useful as clarifying agents for vegetable beverages such as beer, wine and fruit juices.

The invention is illustrated but not restricted by the following Examples, in which the parts are by weight.

EXAMPLES

The adsorptivity of the polymers described below was determined as follows:

100 mg of polymer are placed in 100 ml of a 0.01% tannin solution and shaken therein. Samples are taken at intervals and the polymer is separated by filtration and the residual content of tannin in the filtrate is determined using a 2 mm cuvette in a spectrophotometer at 270 nm. The results are given in percentages of the starting amount after 10 and 40 minutes.

EXAMPLE 1

900 parts of distilled water, 100 parts of vinyl pyrrolidone and 2 parts of divinyl ethylene urea are mixed in a stirred flask. The pH of the solution is adjusted to about 9.5 by the addition of 0.5 part of a 10% solution of sodium hydroxide in water. The solution is then heated to 60° C by vigorously bubbling nitrogen therethrough. A pyruvic acid solution is then added in the amounts given below and the rate of flow of the nitrogen stream is reduced. As soon as the temperature reaches 60° C or at most only a few minutes thereafter, the otherwise clear solution is seen to contain small white flakes which increase in size and number at first only slowly but later at a rapid rate. Depending on the amount of pyruvic acid added, there occurs after from 10 to 200 minutes a distinct reaction which is checked by slight cooling. The mixture is then maintained at 60° C for a further hour and then cooled. There is obtained a pure white suspension of a creamy nature. The polymer is filtered off, washed thoroughly with water and dried in vacuo at 70° C.

Tests on the tannin-binding capacity as outlined above give the following results:

| ml | 10 min | 40 min |
|----|--------|--------|
| 0 | 76% | 54% |
| 0.5 | 40% | 31% |
| 1 | 21% | 15% |
| 2 | 18% | 16% |
| 3 | 17% | 13% |
| 5 | 17% | 14% |

EXAMPLE 2

850 parts of distilled water, 150 parts of vinyl pyrrolidone, 3 parts of N,N'-divinyl ethylene urea and 0.75 part of secondary sodium phosphate as buffer substance are mixed in a stirred flask. The pH is found to be about 7. The mixture is substantially freed from atmospheric oxygen and simultaneously heated to 60° C by the introduction of a vigorous stream of nitrogen. Gel particles form immediately and these grow very rapidly. After about 30 minutes, the mixture becomes pasty and a short reaction takes place. Polymerization is carried to completion at 60° C for a further hour and the mixture is then cooled. The pH of the suspension is about 6. The polymer is worked up as described in Example 1.

The white-colored, somewhat coarse and hard polymer is tested for residual tannin content and gives the following results:
after 10 minutes — 81%
after 40 minutes — 61%.

After milling in a jet mill, the corresponding values are as follows:
after 10 minutes — 58%
after 40 minutes — 45%.

EXAMPLE 3

The same mixture is used as in Example 2, which is purged with nitrogen and heated to 65° C and to which 6 parts of 5% aqeuous ascorbic acid solution are added. Polymerization occurs in a manner similar to that described in Example 2, except that 500 parts of distilled water must be added on completion of the reaction to prevent the stirrer from stopping. Working up is carried out as described in Example 1.

Tests on the tannin adsorption give the following residues of tannin:
after 10 minutes — 27%
after 40 minutes — 22%.

EXAMPLE 4

The same mixture as used in Example 2 but using 1.5 parts of secondary sodium phosphate is purged with nitrogen and heated to 60° C, whereupon 15 parts of 10% aqueous pyruvic acid solution are added immediately. Flakes, which form immediately, grow steadily. After about 45 minutes, the mixture becomes viscous, accompanied by a distinct heat effect, and must be diluted with 500 parts of water. Polymerization is carried to completion over a further hour and the mixture is cooled and worked up as described in Example 1. The pH falls during polymerization from 7.0 to 6.5. The residual amounts of tannin are in this case:
after 10 minutes — 61%
after 40 minutes — 45%.

EXAMPLE 5

The same mixture is used as in Example 2, and this is purged with nitrogen and heated to 60° C, whereupon 1.5 parts of ethyl acetoacetate are added. Flocculation takes place immediately. After about 1 hour, the mixture becomes very thick following a brief reaction and must be diluted with 50 parts of water to prevent the stirrer from stopping. Polymerization is carried to completion over a further hour and the mixture is then cooled and worked up as described in Example 1. The pH falls during polymerization from 7.0 to 6.5.

The residual amounts of tannin are 60% after 10 minutes and 43% after 40 minutes.

We claim:

1. A process for the manufacture of insoluble and only slightly swellable homopolymers of a vinyl lactam or copolymers of two or more vinyl lactams, said vinyl lactam being selected from the group consisting of N-vinyl pyrrolidone, N-vinyl-caprolactam and N-vinyl piperidone in dilute aqueous solution, in which the vinyl lactam or a mixture of the vinyl lactams is polymerized at a pH of at least 6 and at most 10 and with the exclusion of oxygen, wherein the polymerization or copolymerization is initiated by 0.5 to 10% by weight of said monomers of divinyl ethylene urea, and wherein from 0.05 to 2% by weight, based on vinyl lactam of at least one α- or β-ketocarboxylic acid selected from the group consisting of ascorbic acid, ethyl aceto-acetate and pyruvic acid and mixtures thereof is present in the reaction mixture.

2. A process as set forth in claim 1, wherein the vinyl lactam polymerized is vinyl pyrrolidone.

3. A process as set forth in claim 1, wherein polymerization is carried out at from 50° to 100° C.

* * * * *